(12) United States Patent
Howe

(10) Patent No.: US 9,310,498 B2
(45) Date of Patent: Apr. 12, 2016

(54) SEISMIC SURVEY METHOD

(71) Applicant: David John Howe, Surrey (GB)

(72) Inventor: David John Howe, Surrey (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 158 days.

(21) Appl. No.: 13/867,705

(22) Filed: Apr. 22, 2013

(65) Prior Publication Data

US 2014/0140168 A1     May 22, 2014

Related U.S. Application Data

(63) Continuation of application No. 12/310,204, filed as application No. PCT/GB2007/003280 on Aug. 30, 2007, now abandoned.

(30) Foreign Application Priority Data

Aug. 31, 2006    (EP) ..................................... 06254543

(51) Int. Cl.
    *G01V 1/00*          (2006.01)

(52) U.S. Cl.
    CPC ................ *G01V 1/003* (2013.01); *G01V 1/005* (2013.01)

(58) Field of Classification Search
    CPC .............................. G01V 1/003; G01V 1/005
    USPC ................................................ 367/14, 41, 38
    See application file for complete search history.

(56) References Cited

U.S. PATENT DOCUMENTS

| 5,173,879 | A | 12/1992 | Cung et al. ....................... 367/46 |
| 6,140,957 | A | 10/2000 | Wilson et al. ............. 342/357.32 |
| 6,519,533 | B1 | 2/2003 | Jeffryes .......................... 702/17 |

(Continued)

FOREIGN PATENT DOCUMENTS

| EP | 1 341 004 | 9/2003 |
| FR | 2 874 270 | 2/2006 |

(Continued)

OTHER PUBLICATIONS

International Search Report for PCT/GB2007/003280, mailed Oct. 15, 2007.

(Continued)

*Primary Examiner* — Daniel L Murphy
(74) *Attorney, Agent, or Firm* — Edmonds & Nolte, PC

(57) ABSTRACT

Method of performing a 3-D seismic survey using a plurality of vibroseis sources, and an array of seismic sensors arranged within a survey area. Each vibroseis source emits a distinctive acoustic signal and each seismic sensor of the array is in a continuous state of readiness to detect reflected acoustic signals. The method includes assigning vibroseis points (VPs) to each vibroseis source, moving each vibroseis source to assigned VPs where the vibroseis source emits an acoustic signal, recording the emission time of the acoustic signal by each vibroseis source at its assigned VPs together with the geographic position of the assigned VPs, continuously listening for reflected acoustic signals using the seismic sensors and recording a time domain record of the reflected acoustic signals received by each seismic sensor. Reflected acoustic signals associated with emission of an acoustic signal by a vibroseis source at an assigned VP are then determined.

19 Claims, 11 Drawing Sheets

(56) References Cited

U.S. PATENT DOCUMENTS

| | | |
|---|---|---|
| 6,977,867 B2 | 12/2005 | Chamberlain .................. 367/76 |
| 2007/0268781 A1 | 11/2007 | Meunier et al. ................. 367/21 |

FOREIGN PATENT DOCUMENTS

| | | |
|---|---|---|
| GB | 2 306 219 | 4/1997 |
| WO | WO 01/16622 | 3/2001 |

OTHER PUBLICATIONS

Written Opinion of the International Search Report for PCT/GB2007/003280, mailed Oct. 15, 2007.

International Preliminary Report on Patentability for PCT/GB2007/003280, dated Nov. 17, 2008.

Society of Petroleum Engineers, "Overview of Efficient Vibroseis Acquisition Methods", EAGE Conference and Exhibition, vol. 3, (Jun. 12, 2006), pp. 1763-1767.

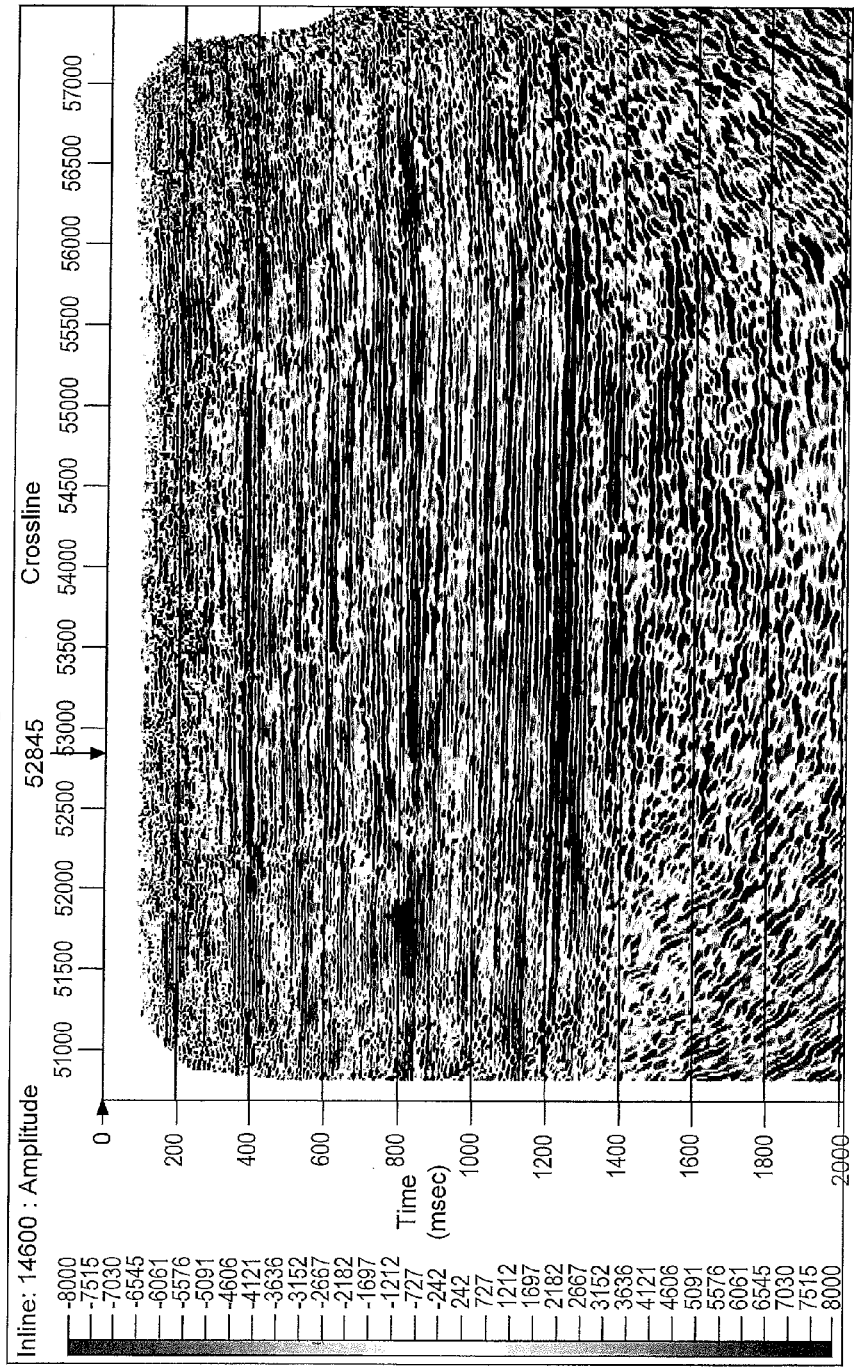

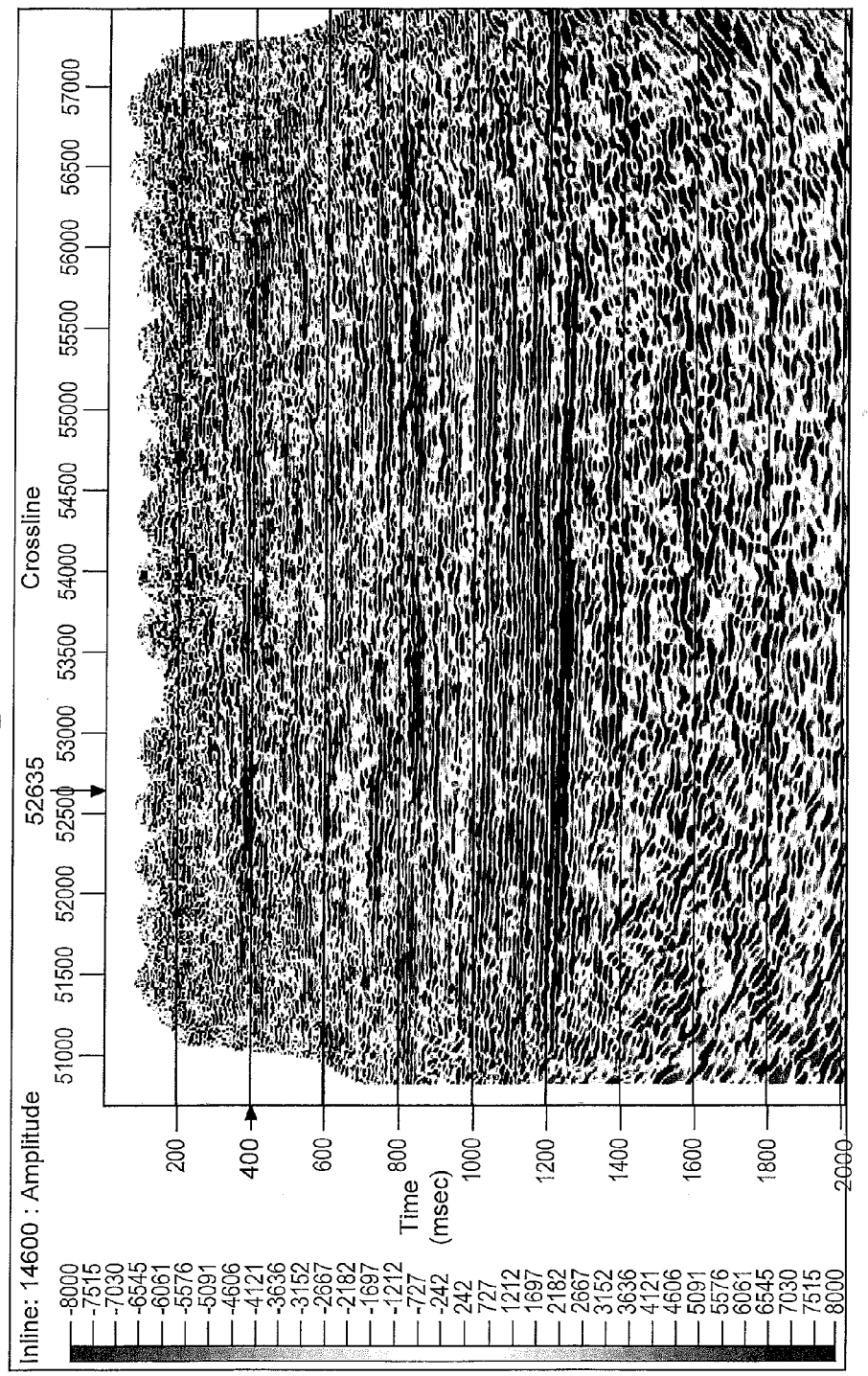

SEISMIC SURVEY METHOD

This application is a continuation of application Ser. No. 12/310,204 filed Feb. 17, 2009 which claims priority to European Patent Application No. 06254543.9 filed Aug. 31, 2006, which is a 371 of PCT/GB2007/003280 filed Aug. 30, 2007, the entire contents of each of which are hereby incorporated by reference.

This invention relates to the field of seismic data acquisition, and, more specifically, to the independent operation of a plurality of vibroseis sources used in three-dimensional (3D) seismic data acquisition operations.

In seismic surveying, acoustic energy waves are emitted into the earth in order to map subterranean geological layers by measuring returned acoustic energy waves reflected from those geological layers. The subterranean geological layers create changes in the generated seismic waves due to refractions, reflections, and diffractions at the boundaries of each subterranean layer. Some of these altered acoustic energy waves return to the earth's surface to be detected by geophones or other suitable seismic sensors. Their arrival time is mainly dependent on the depth of the subterranean layers reflecting the waves.

One type of seismic surveying system uses a vibrator or group of vibrators to provide the source of the acoustic energy (hereinafter referred to as "vibroseis source"). A vibroseis source may generate ("vibrate") the acoustic energy waves at predetermined vibrator points (VPs). The VPs may be marked with a stake placed by surveyors. Alternatively, global positioning satellite (GPS) equipment may be used to locate predetermined VPs.

In vibroseis operations, the vibrator(s) of the vibroseis source typically generates a vibration pattern that changes frequency over a predetermined period of time. This vibration pattern is referred to as a vibratory sweep. A typical vibroseis sweep may be a linear frequency sweep from approximately 10 Hz to 100 Hz and may have a duration of the order of 10 to 20 seconds. Since it takes time for the vibrations to propagate though the earth and reach the sensors, the sensors continue to listen for the reflected vibrations for some period of time, called the listening time, after the vibrator(s) of the vibroseis source has stopped vibrating. Typically, the listening time is of the order of 2 to 8 seconds.

The seismic sensors convert the reflected vibrations into electrical signals and emit these signals to a central recording unit, usually located at the field site. The central recording unit typically has data processing capability such that it can perform a cross-correlation with the source signal (sweep) thereby producing a signal having the recorded vibrations compressed into relatively narrow wavelets or pulses (this is referred to as "pulse compression").

Typically, the vibroseis source is comprised of a single large truck-mounted vibrator or a group of large truck mounted vibrators (hereinafter referred to a "vibroseis trucks(s)"). The truck-mounted vibrator is generally a vibrating pad. The vibrator(s) at each VP are actuated to follow a prescribed swept-frequency signal. Where the vibroseis source comprises a group of vibroseis trucks, the vibrators on each truck of the group are actuated in synchronism to follow the prescribed swept frequency signal. At each VP, the vibroseis truck or group of vibroseis trucks may emit a single sweep or a plurality of sweeps, for example, 5-10 sweeps. The duration of the sweeps may be, for example, 20-30 seconds with a 5 to 10 second gap between sweeps.

Traditionally, seismic operations have been carried out along lines (2-D) of a wide grid, with a single vibroseis source and many geophones progressively traversing each line of the grid, in turn. In recent years, the emphasis has moved to 3-D surveys, in which a plurality of parallel source lines is laid out at right angles or parallel to a plurality of parallel geophone lines, and in which a single source (vibrator or group of vibrators) traverses each source line in turn, recording into the geophones on all geophone lines. This technique is very satisfactory but slow and expensive. The time and cost of a 3-D survey can be reduced by the use of a plurality of vibroseis sources, generally with one vibroseis source traversing each source line. The use of a plurality of vibroseis sources increases the capital cost (in that it requires more vibrators) but decreases the operational cost (in that it is faster).

In the case of conventional non-overlapping vibroseis data acquisition techniques, the plurality of vibroseis sources at the VPs sweep one at a time. After one vibroseis source finishes a sweep, the next vibroseis source waits for at least the listening time before starting the next sweep.

Recently, a technique known as slip-sweep vibroseis data acquisition has been developed in order to speed up seismic acquisition. In the case of slip-sweep vibroseis data acquisition, more than one vibroseis source is allowed to sweep during the same time period in a staggered overlapping sequence. Typically, the delay between the start of one sweep and the next should be at least as long as the listening time. Thus, in general, slip-sweep acquisition can significantly increase the productivity and decrease the cost of vibroseis data acquisition. By allowing sweeps to overlap in time, but ensuring that at least the listening time elapses between sweep start times, the seismic records are still separated in time after correlation.

It is also known that a plurality of vibroseis sources may be operated simultaneously without any time delay between the sweeps at the VPs. In this simultaneous technique, it is essential that the signal emitted by each vibroseis source, typically operating on its own source line, should be highly distinctive. This allows the superimposed geophone output to be separated into the component reflected signals for each source line. However, owing to the difficulty in separating the geophone output into the component reflected signals for each source line, this technique is generally limited to the simultaneous use of 3 or 4 vibroseis sources.

In the above conventional vibroseis operations, control of the operation is typically centralized at the central recording unit, with all events in the data generation and recording process being coordinated at the central recording unit. For example, where a 3-D survey employs a single vibroseis source comprising either a single vibroseis truck or group of vibroseis trucks, and the vibroseis truck or the group of vibroseis trucks has navigated to a VP, a communications link is established between the vibroseis truck or each of the group of vibroseis trucks and the central recording unit. The communications link is typically in the form of an analogue radio signal. When the central recording unit is ready, it communicates its state of readiness with the vibroseis truck(s) at the VP. Where there is a single vibroseis truck at the VP, when both the truck and recorder is ready, a start to sweep command is sent from the central recording unit to the vibroseis truck. Where there is a group of vibroseis trucks at the VP and all of the trucks and the central recording unit are ready, a start to sweep command is sent from the central recording unit to each of the vibroseis trucks and the trucks perform a coordinated sweep. After the sweep is completed, quality control reports may be sent from the vibroseis truck or each of the vibroseis trucks of the group to the central recording unit. These quality control reports include information about whether the vibroseis truck(s) actually performed a sweep, whether the sweep was within specification, and, if equipped with global positioning satellite (GPS) equipment, the position of the truck(s) at the time of the sweep. Where more than one sweep is required at an occupied VP, this cycle continues until the required number of sweeps for the occupied VP are completed. At the end of the last sweep for a VP the vibroseis truck(s) picks up its vibrator pad and proceeds to the next VP.

A problem with current 3-D seismic operations using a plurality of vibroseis sources is that the system designs require the recorder to have positive control over the operations of the vibroseis sources in order for the seismic survey to proceed. This can considerably slow down a survey, especially when the communications link between the recorder and one or more of the plurality of vibroseis sources is interrupted.

Another method for seismic exploration is disclosed in WO 2006/018728. The method comprises the steps of controlling a plurality of sources so that they emit a plurality of seismic waves in a subsurface zone to be explored, each source successively occupying a plurality of emitter positions. For each emission, a signal representative of the emission is produced and the position of the source and the instant at which the emission starts are recorded. Seismic sensors continuously record the composite signals reflected by the medium in response to said emissions. Shot point migration is carried out on the one hand, from a reflected wave field constituted of said composite signals and respective sensor positions and on the other hand from an incident wave field constituted of signals representative of emissions, source positions and start emission instants; so as to obtain a seismic image. Accordingly, the method involves splitting up the wavefield and so can be complicated and can require significant computational effort, particularly as the number of sources increases. Thus the amount of data that can easily be handled is limited.

The present invention relates to a 3-D seismic survey operation that uses (i) a plurality of vibroseis sources, and (ii) an array of seismic sensors arranged within a survey area wherein each vibroseis source emits a distinctive acoustic signal and each seismic sensor of the array is in a continuous state of readiness to detect reflected acoustic signals, the survey operation comprising:
(a) assigning vibroseis points (VPs) to each of the vibroseis sources;
(b) independently moving each vibroseis source to assigned vibroseis point (VPs) where the vibroseis source emits its distinctive acoustic signal independently in time of the emission of the distinctive acoustic signals of the other vibroseis sources at their assigned vibroseis points (VPs);
(c) recording the emission time of the distinctive acoustic signal by each vibroseis source at its assigned VPs together with the geographic position of the assigned VPs;
(d) continuously listening for reflected acoustic signals using the array of seismic sensors and recording a time domain record of the reflected acoustic signals received by each seismic sensor of the array;
wherein the reflected acoustic signals associated with the emission of a distinctive acoustic signal by a vibroseis source at an assigned VP are determined by:
(i) extracting the reflected acoustic signals from the time domain records for the seismic sensors of the array during a predetermined listening time associated with the emission of the distinctive acoustic signal by the vibroseis source at the assigned VP;
(ii) cross-correlating the extracted reflected acoustic signals with the distinctive emitted acoustic signal for the vibroseis source at the assigned VP thereby eliminating weakly correlated signals; and
(iii) attenuating randomised cross-contamination in the cross-correlated extracted reflected acoustic signals from step (ii) using random noise attenuation techniques.

In the 3-D seismic surveying operation of the present invention, a plurality of vibroseis sources are operated independently of each other. Thus, each vibroseis source is moved independently from the other vibroseis sources to assigned VPs within the seismic survey area. In addition, each vibroseis source emits its distinctive (unique) acoustic signal independently in time of the other vibroseis sources. In other words, each vibroseis source operates independently in terms of both its geographic position (VP) and the time of emission of its distinctive acoustic signal. No synchronisation in time or in space is required. Instead, the movement and signal emission time of the vibroseis sources are random by default of the method. Accordingly, there is no requirement for central control of the emission of the distinctive acoustic signals by the plurality of vibroseis sources. This considerably speeds up the seismic surveying operation as each vibroseis source may start emitting its distinctive acoustic signal without having to wait for one or more of the other vibroseis sources to emit their distinctive acoustic signals.

The random operation of the vibroseis sources may result in either a partial or complete overlap in the time of emission of the distinctive acoustic signals by two or more vibroseis sources such that reflected acoustic signals associated with the different distinctive emitted acoustic signals are received together by the seismic sensors of the array. However, it has been found that, in the new step of applying correlation techniques in this seismic survey method a certain degree of discrimination between such co-received reflected acoustic signals can advantageously be achieved. Thus, the reflected acoustic signals received during the listening time for a particular acoustic signal emitted by a vibroseis source at an assigned VP are correlated with the distinctive acoustic signal emitted by that vibroseis source. Such correlation techniques are well known to the person skilled in the art.

Accordingly, the reflected acoustic signal received for an acoustic signal emitted by a particular vibroseis source at a particular VP can be highlighted compared with signals received for the other sources. Any cross-contamination between the different reflected acoustic signals associated with the different distinctive acoustic signals emitted by the vibroseis sources will appear random from one VP to the next in certain space-time domains and so signals received as a result of the other vibroseis sources appear as random noise. Accordingly, the randomised cross-contamination in the reflected acoustic signals may be attenuated by further processing of the reflected data, for example, using 3-D predictive filtering. Thus, although the acquired reflected data may be relatively noisy, this noise can be adequately filtered out such that the processed reflected data are of sufficient quality to allow an accurate map of the subterranean geographical layers at the survey site to be obtained. Random noise attenuation techniques are well known to the person skilled in the art. This treatment of the interfering signals as random noise and the subsequent attenuation of the random noise is another unique feature of the invention.

Applying these correlation and attenuation techniques in this way provides a relatively simple method of determining the reflected acoustic signal associated with the emission of a distinctive acoustic signal by a vibroseis source at an assigned VP. Large quantities of data from numerous vibroseis sources can be handled with relative computational ease, allowing significant operational efficiency. This is in contrast to the method set out in WO 2006/018728, wherein shot migration is required to decompose the wavefield of coincident shots.

The distinctive emitted acoustic signal is preferably of a defined frequency range which is non-repetitive within the maximum reflection time of interest. The emitted acoustic signal is usually of swept-frequency form with upsweeps, downsweeps and pseudo-random sweeps being used. Typically, the sweep has a range of frequencies of from 5 Hz to 100 Hz, preferably from 10 Hz to 100 Hz and may have a duration of the order of 10 to 40 seconds, preferably 10 to 20 seconds. However, the signal bandwidth, signal spectrum and total energy radiated or emitted for each distinctive sweep should be substantially the same. Methods of generating distinctive sweep signals are well known to the person skilled in the art. Each vibroseis source, when positioned at an assigned VP, may emit a single acoustic signal or a plurality of acoustic signals separated in time, for example, 2 to 6 acoustic signals separated in time.

The vibroseis source may comprise a single vibrator or a plurality of vibrators, for example, 2 to 6 vibrators, preferably, 2 to 4 vibrators. Where the vibroseis source comprises a plurality of vibrators, the vibrators emit a coordinated acoustic signal. It is envisaged that a local area network (LAN) may be used to coordinate the distinctive acoustic signal (for example, distinctive sweep) of the plurality of vibrators such that they vibrate in unison. The LAN may be a wireless network that is capable of communicating with all of the vibrators of the group. In particular, the LAN will communicate the time to initiate a sweep, and to perform post sweep checks.

Suitably, the vibroseis source is a single vibroseis truck or a group of vibroseis trucks wherein each vibroseis truck is provided with a vibratory pad for transmitting the acoustic signal. Preferably, each vibroseis source is a single vibroseis truck. The vibroseis trucks may navigate from VP to VP in the survey area using a global-positioning system (GPS) receiver in each of the trucks or by using pre-placed survey stakes that mark out the survey area. When a vibroseis truck reaches an assigned VP, it lowers its pad in preparation for emitting its distinctive acoustic signal. A GPS receiver in the vibroseis truck computes the geographic position of the vibroseis truck based on radio signals received from satellites orbiting the earth. The time of transmission of the acoustic signal is also determined using a highly accurate digital clock that is synchronised to GPS time (for example, using a GPS time pulse signal). The characteristics of the distinctive acoustic signal are also determined. After the truck has emitted its distinctive acoustic signal (for example, has completed its sweep), the truck self-evaluates its performance and a decision is made whether to repeat the sweep. The "source" information (time of transmission of the acoustic signal, the characteristics of the distinctive acoustic signal and the geographical position of the truck) is either recorded on a dedicated recorder of the truck or is transmitted to a central recording unit (if available) via a reliable communications link.

Preferably, each vibroseis source is assigned a plurality of VPs within the survey area at which to emit its distinctive acoustic signal. However, if one vibroseis source runs into a problem with emitting its distinctive acoustic signal at a particular VP, it will be possible for another vibroseis source to be switched to the VP in order to facilitate completion of the surveying operation. Thus, the surveying operation of the present invention provides improved flexibility over known surveying operations.

Typically, for a given VP, data is recorded from seismic sensors covering an area in the range of 20 to 100 km². Preferably, the seismic sensors of the array are distributed throughout the survey site. Typically, the array comprises at least 5000 seismic sensors. Typically, the seismic sensors of the array are geophones or accelerometers. Suitably, the seismic sensors are arranged in rows to form a grid.

It is a feature of the surveying operation of the present invention that (a) the emission time of the acoustic signal at an assigned VP (i.e. the time of initiation and completion of the distinctive acoustic signal), (b) the characteristics of the emitted acoustic signal, and (c) the precise location of the VP are accurately determined and recorded. Where the acoustic signal is a sweep, it is envisaged that, in addition to the emission time of the sweep, that other details of the sweep may be recorded including, the start frequency, end frequency, and parameters such as the taper of the sweep. Alternatively, the exact form of the sweep may be recorded. Preferably, each vibroseis source is provided with global positioning satellite (GPS) equipment for determining the geographic position of an assigned VP. Preferably, the geographic position of the VP is determined to within 3 meters. In addition, each vibroseis source may be provided with a highly accurate digital clock synchronised to GPS time for determining the emission times of the distinctive acoustic signals. Preferably, the emission times of the distinctive acoustic signals are recorded to an accuracy of 1 ms or less. Suitably, each vibroseis source has a dedicated recorder for recording this information. Alternatively, this information may be recorded at a central recording unit provided that a reliable (continuous) communications link can be established between the vibroseis source and the central recording unit.

The method of the present invention relies on continuous listening for reflected acoustic signals using the array of seismic sensors together with continuous recording of the reflected data. Thus, the seismic sensors are in a continuous state of readiness to detect reflected acoustic signals. Suitably, each seismic sensor of the array may be provided with a dedicated recorder for recording a time domain record for the reflected acoustic signals detected by the seismic sensor. However, it is also envisaged that a group of seismic sensors (for example, a group of 10 to 100 seismic sensors) may be provided with a dedicated recorder for recording the time domain records of the reflected acoustic signals received by each of the seismic sensors of the group. Typically, the group of seismic sensors is a geophone string and the recorder is included in a field box associated with each geophone string. Accordingly, the term "dedicated recorder" refers to either a recorder linked to an individual seismic sensor or to a recorder linked to a group of seismic sensors (in particular, a geophone string). Alternatively, if a central recording unit is available, the time domain record for each seismic sensor of the array may be recorded at the central recording unit, provided that a reliable (and continuous) communications link can be established between the sensors of the array and the central recording unit.

By "continuous recording" is meant that digital data samples are recorded at regular intervals of, for example, 4 ms, together with the measurement time of each digital data sample. Thus, the seismic sensors convert any detected acoustic waves into digital data samples that are transmitted to the recorder where the digital data samples are recorded together with the recording time of each digital data sample such that a time domain record of the reflected acoustic signals is stored by the recorder. The recording time is synchronised with GPS time, for example, using a GPS time pulse signal which is transmitted to the recorder. It is essential that the time domain records of the reflected acoustic signals are accurate to within 1 ms or less in order to allow cross-correlation of the reflected acoustic signals with the distinctive (unique) acoustic signal emitted by each vibroseis source.

Where a central recording unit is available, it is envisaged that the central recording unit may record: (i) the time domain records for the reflected acoustic signals detected by the seismic sensors of the array; (ii) the emission times of the distinctive acoustic signals by the plurality of vibroseis sources; (iii) the characteristics of the distinctive acoustic signals; and (iv) the precise location of the VPs. This data may be stored on magnetic tape which is sent to a seismic data processing centre, typically located at another geographic location, where the data is downloaded into a computer which performs the extraction and cross-correlation of the reflected acoustic signals. Alternatively, the central recording unit may be sent to the seismic data processing centre where the recorded data is recovered from the recorder and downloaded into the computer. Thus, the data stored using the central recording unit may be analysed days or weeks after having been obtained ("after the event" processing). The extracted and cross-correlated data is then further processed using random noise attenuation techniques, for example, 3D predictive filtering, to attenuate the randomised cross-correlation in the reflected acoustic signals.

It is also envisaged that the central recording unit may have sufficient processing capacity to extract the reflected acoustic signals received during the listening time for an emitted acoustic signal at an assigned VP and to cross-correlate the reflected acoustic signals received during the listening time with the emitted acoustic signal. Thus, the central recording unit may perform the extraction and cross-correlation of the reflected acoustic signals in real time or close to real time. Once the central recording unit has performed the correlation it may typically store the correlated data in the form of time domain traces, for example on a magnetic tape. The data, in the form of the magnetic tape may be sent for further processing and analysis to a seismic data processing centre. For example, the data may be further processed to attenuate the randomised cross-contamination in the reflected acoustic signal's, as described above.

Where a central recording unit not available, dedicated recorders are provided for storing the time domain record(s) of the reflected acoustic signals received by each seismic sensor or by a group of seismic sensors. In addition, each vibroseis source will have its own dedicated recorder for recording the time of emission time of the distinctive acoustic signal at an assigned VP together with the characteristics of the distinctive acoustic signal and the precise geographic location of the VP. The time record of the dedicated recorder for each vibroseis source is then compared with the time domain records of the reflected acoustic signals received by the dedicated recorders of the sensors of the array thereby allowing the extraction of reflected signals received during the listening time for the acoustic signals emitted by each vibroseis source. This processing may be carried out using a computer at a seismic processing centre. Thus, the dedicated recorders of the vibroseis sources and the dedicated recorders of the array of seismic sensors may be sent to the seismic processing centre where the stored data is downloaded into the computer, often days or weeks after the data has been obtained ("after the event" processing). As discussed above, the seismic processing centre may also be capable of carrying out further processing, for example, using 3-D predictive filtering, to attenuate the randomised cross-contamination in the reflected data.

The present invention will now be illustrated, by way of example only, with respect to the following figures in which:

FIG. 10 shows a survey carried out in accordance with the present invention;

FIG. 11 shows a conventional survey of the same area as surveyed with reference to FIG. 10.

Figure 1:
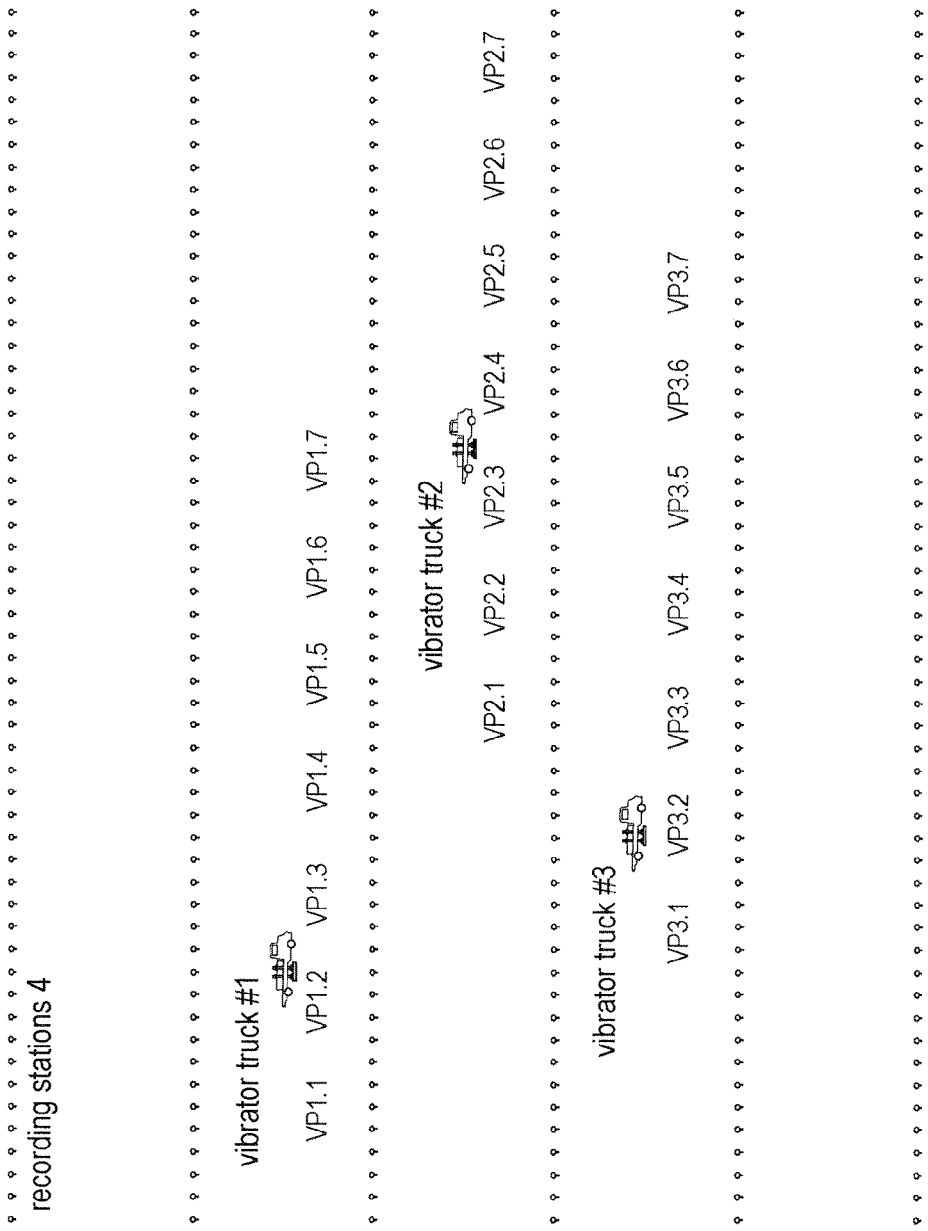
FIG. 1 illustrates one embodiment of a 3-D survey operation according to the invention.

The survey operation depicted in FIG. 1 (not drawn to scale) includes vibroseis trucks, 1, 2 and 3, each having an onboard dedicated recorder (not shown) for recording the times of emission of the distinctive acoustic signal by each truck and the geographic positions (VPs) of each truck during the emission of the acoustic signals, multiple recording stations 4 each provided with at least one seismic sensor wherein each recording station 4 has a dedicated recorder for recording a time domain record of the reflected acoustic signals received by its seismic sensor(s). Each vibroseis truck 1, 2, and 3 is capable of independently moving to a VP where the truck generates a distinctive acoustic signal (performs a sweep) independently in time of the other vibroseis trucks.

An array of seismic sensors distributed over the survey area is used to continuously listen for reflected acoustic signals returning from subterranean layers. The seismic sensors transmit the detected reflected acoustic signals in the form of digital signals to the recording stations 4 where a time domain record of the reflected acoustic signals is recorded on the dedicated recorder of each recording station 4. After completion of the surveying operation, the dedicated recorders of the recording stations 4 may be sent to a seismic processing centre where the data stored on the dedicated recorders are downloaded onto a computer.

The start times for the emission of the sweeps by each vibroseis truck 1, 2 and 3 at its assigned VP are recorded on a dedicated recorder positioned on the truck together with the geographic position of the truck during the sweep. The truck mounted recorder may be sent to the seismic processing centre where the data is downloaded into the same computer as the time domain records of the reflected acoustic signals that are downloaded from the recorders of the recording stations. The computer then extracts the downloaded reflected data received during the listening time for a sweep at an assigned VP and cross-correlates this reflected data with the distinctive sweep at the VP.

If another truck initiates its distinctive sweep at a different VP overlapping in time with the truck at the first VP, the correlation process should at least partially distinguish between the reflected waves corresponding to the sweep at the first VP and the reflected waves corresponding to the sweep at the second VP. Any cross-contamination between different reflected acoustic signals associated with different distinctive sweeps emitted by different vibroseis trucks at different VPs will appear random from one VP to the next. Accordingly, further processing of the data may be carried out using random noise attenuation techniques, for example, 3-D predictive filtering, in order to improve the attenuation of the randomised cross-contamination in the reflected data.

After completion of its sweep at its first assigned VP, the vibroseis truck is free to move to a different VP and to start a further sweep independently in time of the start of the sweeps by the other trucks (and without having to wait for the other trucks to emit their sweeps). It is preferred that the trucks 1, 2 and 3 visit their assigned VPs in a predetermined order. However, the system of the present invention is flexible in that if one truck has difficulty with emitting a sweep at a VP and is therefore delayed in reaching its next VP, a different truck could be assigned the next VP.

Figure 2:
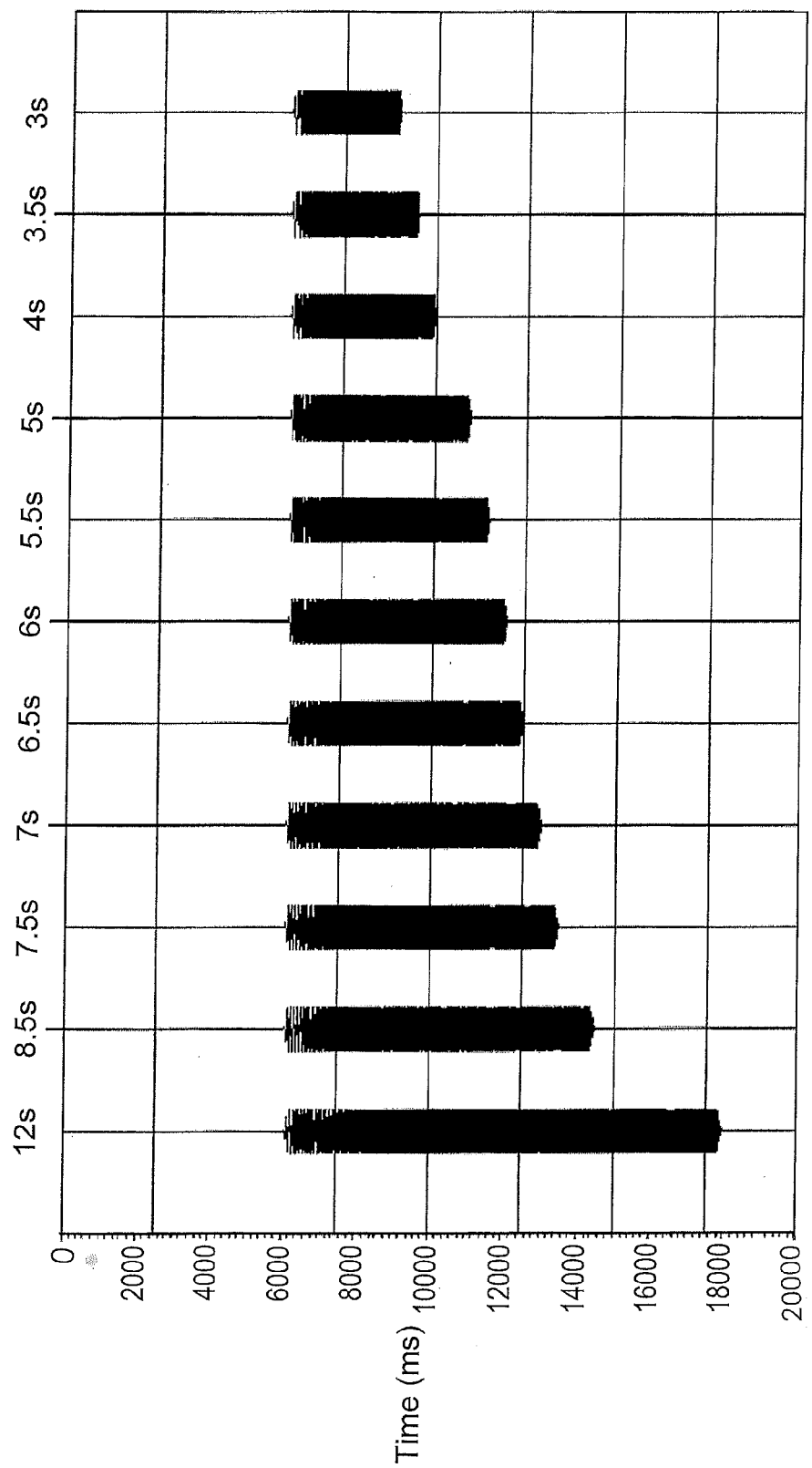
FIG. 2 shows examples of sweeps for use in the present invention, each vibroseis unit sweeping with one of the unique sweeps.

In one example of the invention, each vibroseis source emits a signal lasting 12 seconds. The total energy emitted over the duration of the signal for any one source is the same as that emitted by the other sources. The signal emitted by a source can be a single sweep over a given frequency range or can be built up of multiple sweeps. FIG. 2 shows an example of the sweeps that can be used in this example. Each sweep is an upsweep from 6 Hz to 80 Hz. One vibroseis source can emit a single sweep of 12 seconds. Another source can emit a first sweep lasting 8.5 seconds followed by a second sweep lasting 3.5 seconds. A further source can emit two consecutive sweeps, each lasting 6 seconds. Yet a further source can emit three consecutive sweeps, each lasting 4 seconds, and so on.

Figure 3:
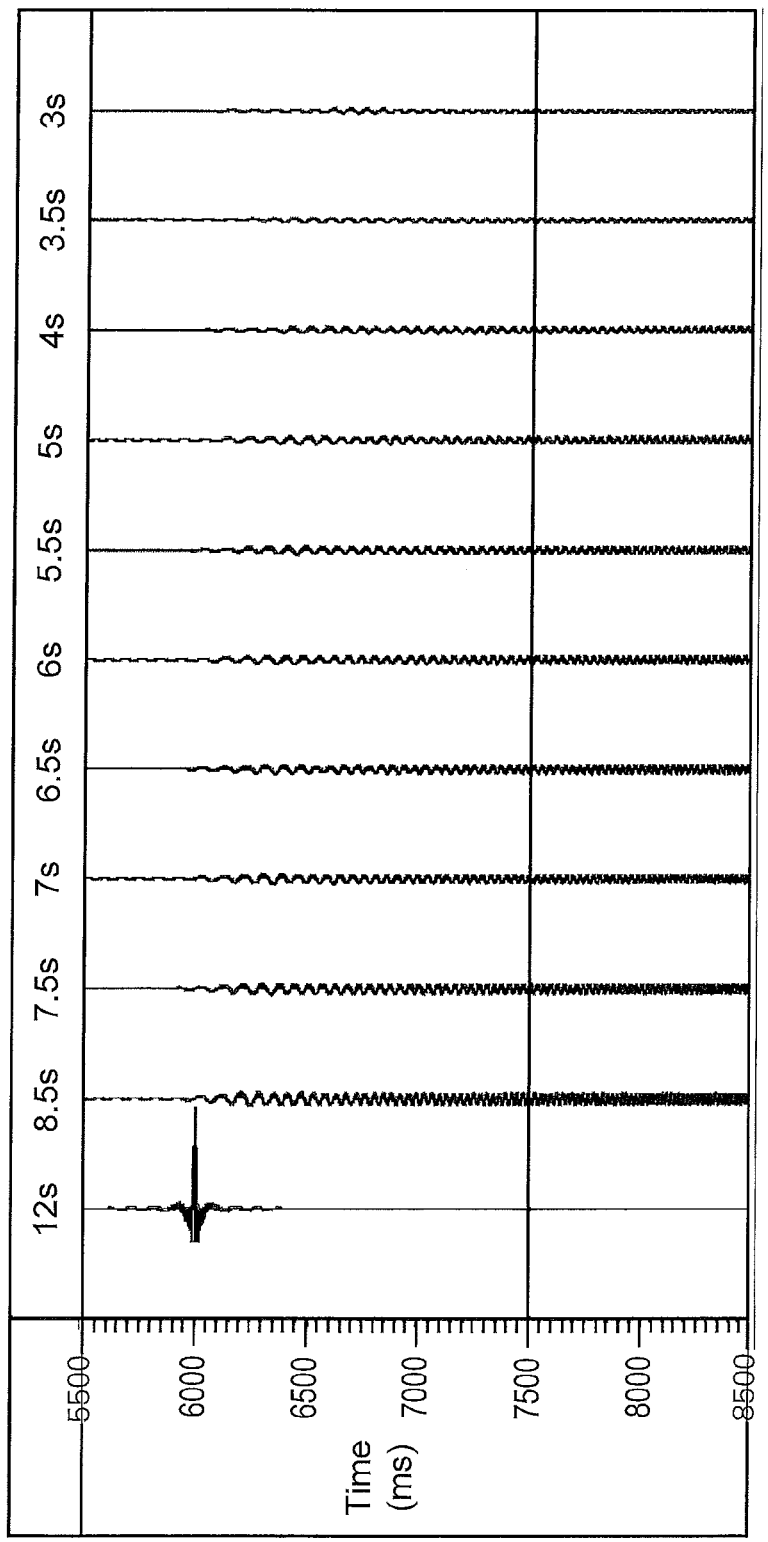
FIG. 3 shows the effect of correlating the sweeps of FIG. 2 with the 12 second sweep.

Each of the sweeps is correlated with the 12 second sweep, and the results are shown in FIG. 3. A spike can be seen for the 12 second sweep, thereby indicating a correlation, whereas no correlation is seen between the other sweeps with the 12 second sweep. It is therefore possible to take a received signal comprising the reflections from multiple sources and highlight that part of the signal reflected from a particular source.

Figure 4:
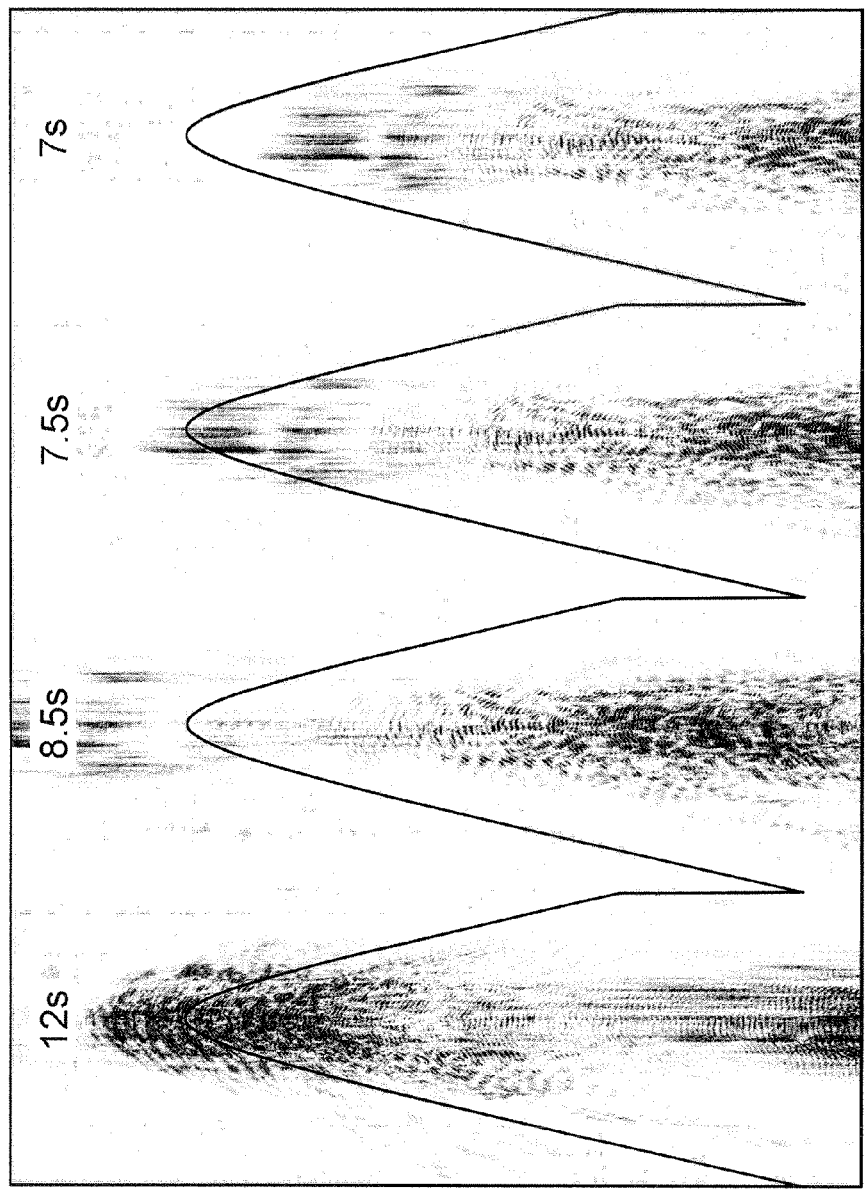
FIG. 4 shows shots from four sweeps cross-correlated with the 12 second sweep.

FIG. 4 shows the result of test signals using 12 sec, 8.5 sec, 7.5 sec and 7 sec sweeps, the received signals having been correlated with the 12 second source. It can be seen how the correlation highlights the signal received from the 12 second emission.

Figure 5:
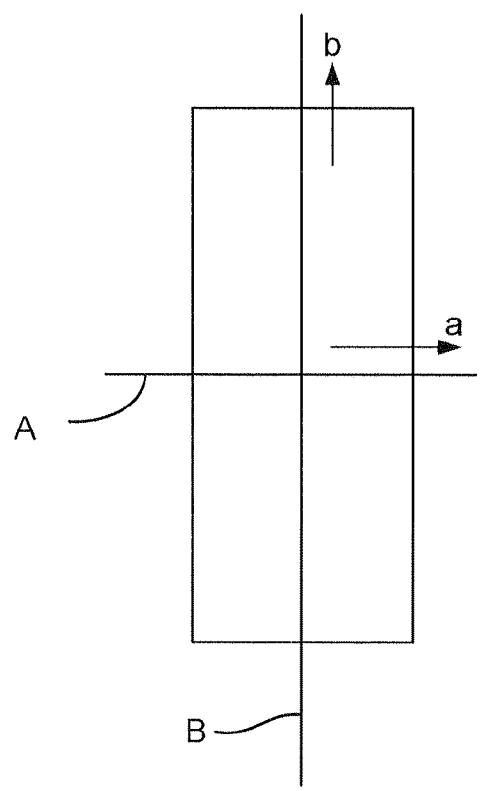
FIG. 5 is a schematic of a field showing the direction of the shot lines and the receiver lines and showing the common receiver direction and the common source direction.

FIG. 5 is a schematic of a field showing the movement of a source (shot line, A), a row of receivers (receiver line, B), the common receiver direction (a) and the common source direction (b). The following gathers are viewed in either the common receiver direction or the common source direction.

FIGS. 6 to 9 show the trace number along the bottom horizontal axis and seconds along the vertical axis.

Figure 6:
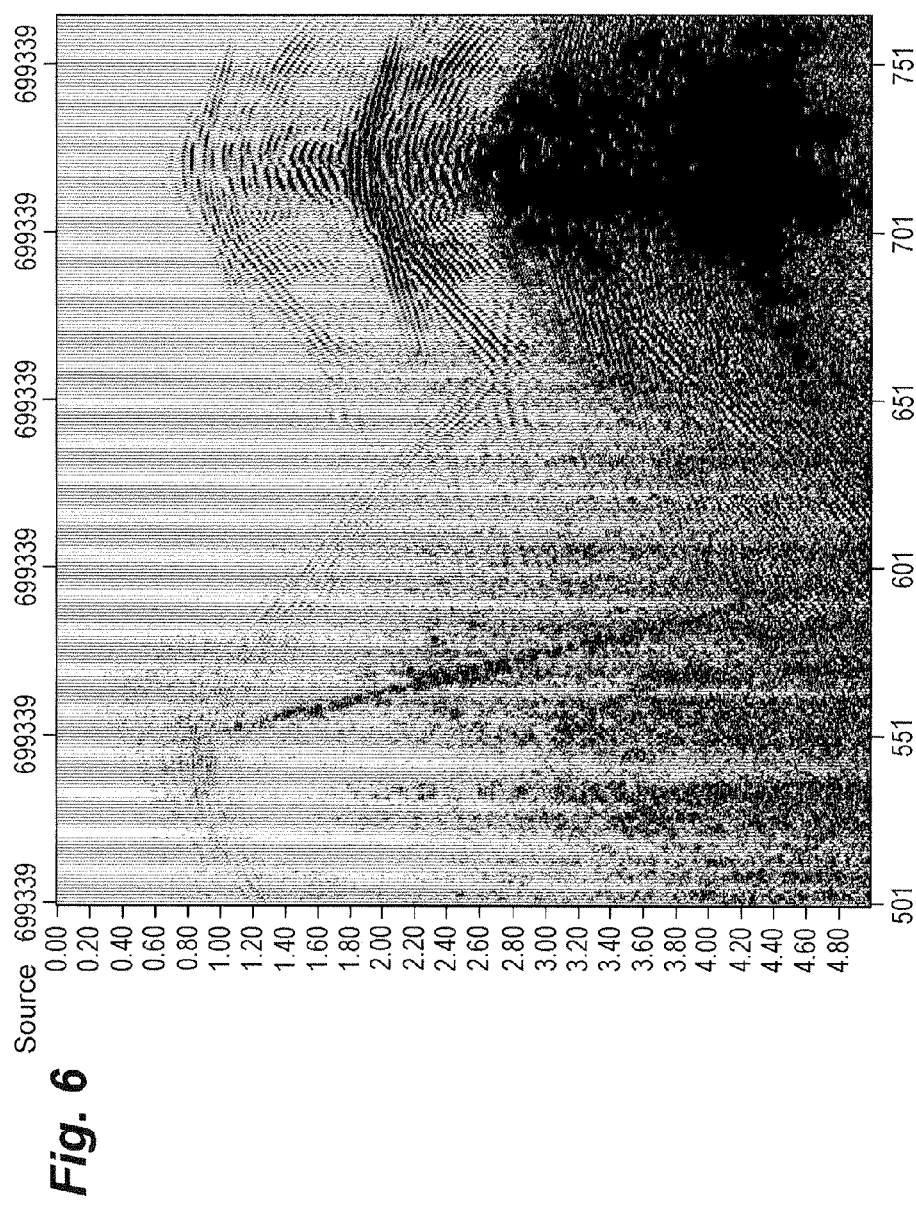
FIGS. 6 and 7 show cross spread inline (common source) gathers with and without noise attenuation.

FIG. 6 shows a cross spread inline (common source) gather after correlation has been carried out for that particular source but before attenuating the randomised cross-contamination. The signal received at the various sensors from the source of interest can be seen to the left of the gather and the signal received from another source also appears to the right of the plot as cross-contamination.

Figure 7:
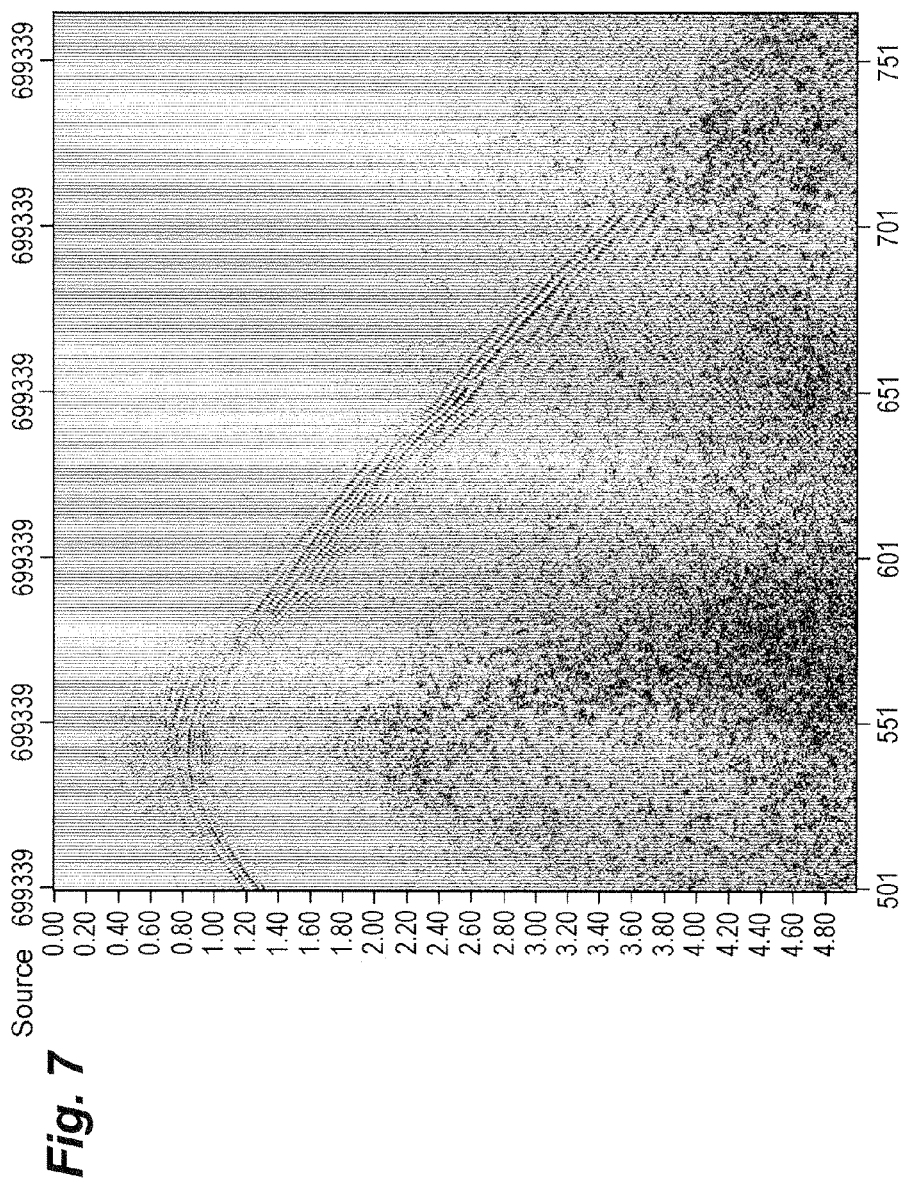

FIG. 7 shows the gather after random noise attenuation in the common receiver direction. It can be seen that the received signal corresponding to the source of interest is more prominent and the data corresponding to the other source(s) (the cross-contamination) has been almost completely removed.

Figure 8:
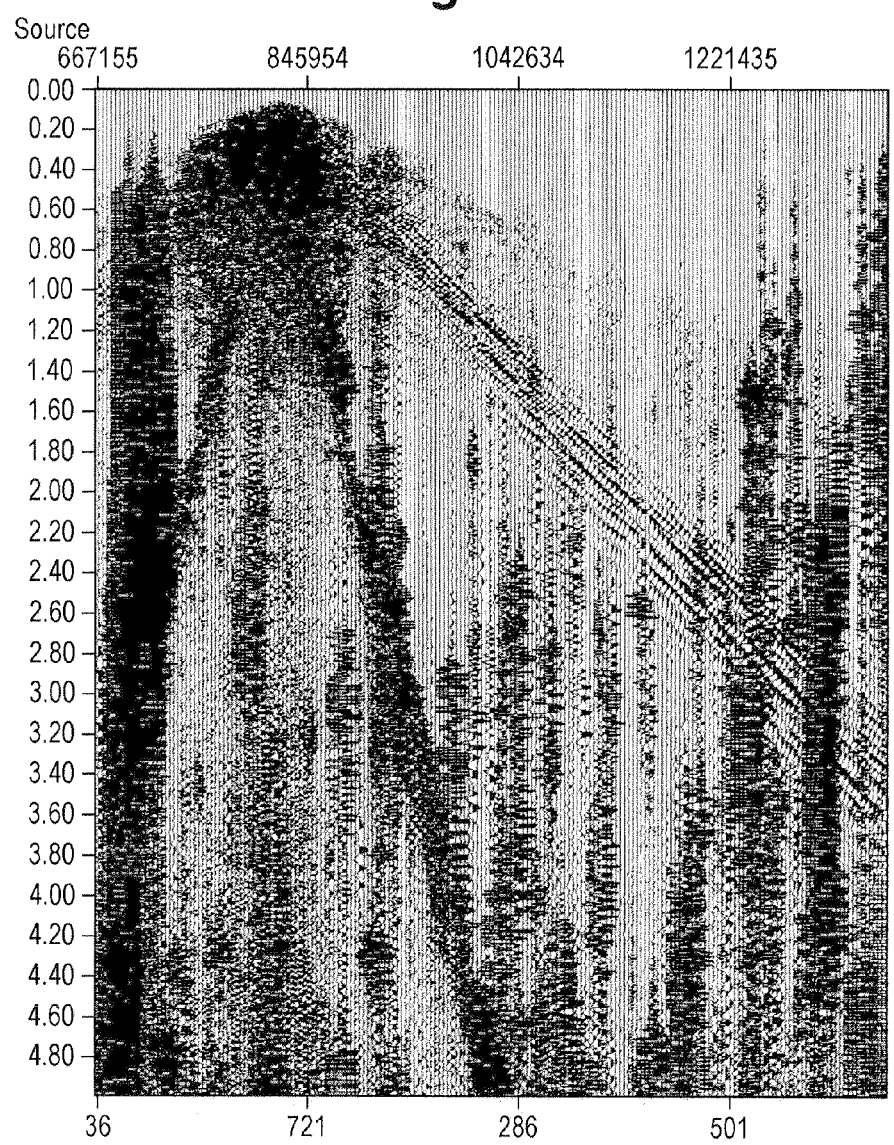
FIGS. 8 and 9 show cross spread cross-line (common receiver) gathers with and without noise attenuation.
Figure 9:
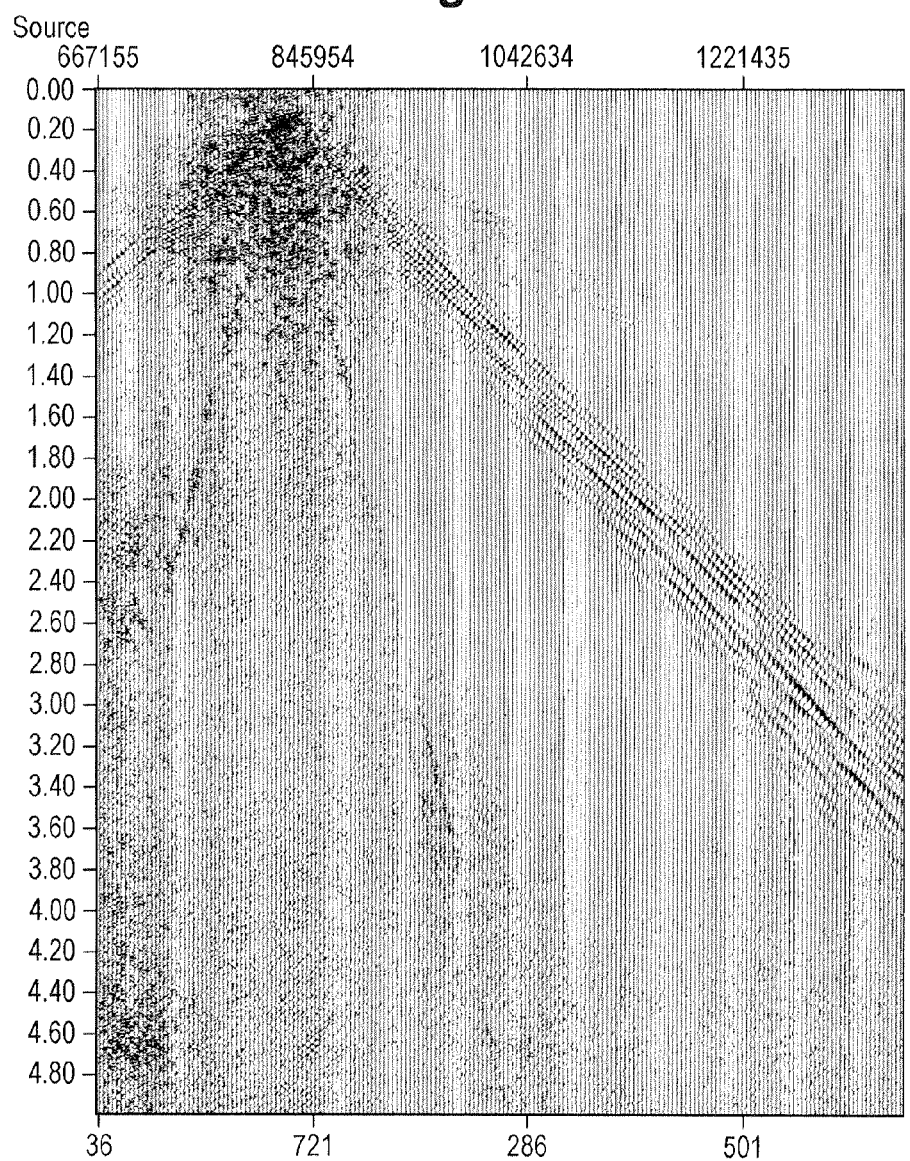

Similarly, FIGS. 8 and 9 show cross spread cross-line (common receiver) gathers. In FIG. 8, cross-correlation has already been applied but the step of attenuating randomised cross-contamination has not yet been carried out and cross-contamination from another source is present. After random noise attenuation, the signal of interest is seen more clearly and the random noise is suppressed, as shown in FIG. 9.

In an example of the present invention, 8 vibrators were each assigned a number of vibroseis points (VPs). The VPs were 15 m apart. An array of sensors was activated and caused to record continuously. The vibrators were deployed and allowed to work independently of the other vibrators to emit a distinctive 36 second signal at each of its assigned VPs. The vibrators typically spent 20 seconds moving from one VP to the next. Accordingly, just over 500 VPs can be scanned per hour. In the example, 480 VPs were scanned.

As a comparison, the same area was surveyed using conventional non-overlapping vibroseis data acquisition techniques where the plurality of vibroseis sources at the VPs sweep one at a time. In this survey, four fleets of two vibrators were deployed. Each fleet was assigned a number of vibroseis points (VPs) spaced 30 m apart. One fleet vibrated while the others moved. The vibration time at each VP was 12 seconds and 4 seconds listening time followed. A 2 second "overhead" was allowed. Accordingly, 200 VPs can be scanned per hour. In the example, 110 VPs were scanned.

It can be seen, therefore, that the survey method of the present invention allows many more VPs to be scanned per hour, compared with the conventional technique. In fact, four times the fold in one sixth the time can be achieved compared with the conventional method. This allows a reduction in unit cost and/or can provide the ability to shoot highly sampled development quality 3D gathers, for example for reservoir management. The cross-correlation and random noise attenuation steps also enable the increased quantities of data to be handled efficiently.

FIGS. 10 and 11 show gathers from the two surveys. FIG. 10 shows a gather from the survey according to the present invention and FIG. 11 shows a gather from the survey carried out in accordance with the conventional method. An improved survey is possible with the present invention, both in terms of the quality of the results and also in terms of the cost of conducting the survey.

The invention claimed is:

1. A method of performing a 3-D seismic survey operation using (i) a plurality of sources comprising a vibrator or a group of vibrators, and (ii) an array of seismic sensors arranged within a survey area wherein each source emits a distinctive acoustic signal and each seismic sensor of the array is in a continuous state of readiness to detect reflected acoustic signals, the method comprising:

(a) assigning vibrator points (VPs) to each of the sources;

(b) independently moving each source to the assigned VPs where the source emits its distinctive acoustic signal independently in time of the emission of the distinctive acoustic signals of the other sources at their assigned VPs;

(c) recording the emission time of the distinctive acoustic signal by each source at its assigned VPs together with the geographic position of the assigned VPs;

(d) continuously listening for reflected acoustic signals using the array of seismic sensors and recording a time domain record of the reflected acoustic signals received by each seismic sensor of the array;

wherein the reflected acoustic signals associated with the emission of a distinctive acoustic signal by a source at an assigned VP are determined by:

(i) extracting the reflected acoustic signals associated with the emission of a distinctive signal from the time domain records for the seismic sensors of the array during a predetermined listening time associated with the emission of the distinctive acoustic signal by the source at the assigned VP;

(ii) cross-correlating the extracted reflected acoustic signals with the distinctive emitted acoustic signal for the source at the assigned VP thereby eliminating weakly correlated signals and storing the correlated data in the form of time domain traces; and (iii) attenuating randomised cross-contamination in the cross-correlated extracted reflected acoustic signals from step (ii) using random noise attenuation techniques.

2. A method as claimed in claim 1 wherein the distinctive acoustic signal that is emitted by each source is of swept frequency form having a range of frequencies in the range 10 Hz to 100 Hz and a duration of 10 to 20 seconds with the proviso that the signal bandwidth, signal spectrum and total energy of the acoustic signals emitted by each source are substantially the same.

3. A method as claimed in claim 1 wherein (a) the emission time of the distinctive acoustic signal at an assigned VP, (b) the characteristics of the distinctive emitted acoustic signal, and (c) the precise geographic position of the VP ("source data"), are determined and recorded on either a dedicated recorder for the source or a central recording unit.

4. A method as claimed in claim 3 wherein each source is provided with global positioning satellite (GPS) equipment for determining the precise geographic position of the VP.

5. A method as claimed in claim 3 wherein each source is provided with a highly accurate digital clock synchronised to GPS time for determining the emission times of the distinctive acoustic signals.

6. A method as claimed in claim 1 wherein the source is a truck having a vibratory pad for transmitting the distinctive acoustic signal.

7. A method as claimed in claim 6 wherein the trucks navigate from VP to VP in the survey area using a GPS receiver in each of the trucks.

8. A method as claimed in claim 1 wherein (a) each seismic sensor of the array is provided with a dedicated recorder for recording a time domain record of the reflected acoustic signals detected by the seismic sensor or (b) a group of seismic sensors is provided with a dedicated reorder for recording the time domain records of the reflected acoustic signals received by each of the seismic sensors of the group.

9. A method as claimed in claim 8 wherein the data stored on the dedicated recorders for the seismic sensors together with source data stored on either dedicated recorders for the sources or on a central recording unit are downloaded into a computer at a seismic processing centre which performs the extraction, cross-correlation and further processing of the cross-correlated data using random noise attenuation techniques to attenuate the randomised cross-correlation in the extracted reflected acoustic signals.

10. A method as claimed in claim 1 wherein the time domain records of the reflected acoustic signals detected by the seismic sensors of the array are recorded at a central recording unit.

11. A method as claimed in claim 10 wherein the central recording unit also records (a) the emission time of the distinctive acoustic signal at its assigned VP, (b) the characteristics of the distinctive emitted acoustic signal, and (c) the precise geographic position of the assigned VP ("source data"), and wherein the central recording unit also performs the extraction and cross-correlation of the reflected acoustic signals and records the extracted and correlated reflected acoustic signals in the form of a time domain record.

12. A method as claimed in claim 11 wherein the extracted and cross-correlated time domain records recorded on the central recording unit are downloaded into a computer at a seismic processing centre which further processes the data using random noise attenuation techniques to attenuate the randomised cross-correlation in the extracted reflected acoustic signals.

13. A method as claimed in claim 1 wherein the seismic sensors of the array are geophones or accelerometers that are arranged in rows to form a grid.

14. A method as claimed in claim 1, wherein the 3-D seismic survey operation is a land-based 3-D seismic survey operation.

15. A method for use in exploring subterranean geological formations, comprising:
    accessing a set of seismic data representative of a subterranean geological formation, the seismic data including a plurality of reflected acoustic signals recorded in the time domain from independently emitted, interfering, distinctive acoustic signals;
    extracting the reflected acoustic signals associated with the emission of a distinctive acoustic signal from the time domain records during a predetermined listening time associated with the emission of a distinctive acoustic signal by a source at an assigned vibrator point ("VP");
    cross-correlating the extracted reflected acoustic signals with the distinctive emitted acoustic signal for the source at the assigned VP thereby eliminating weakly correlated signals and storing the correlated data in the form of time domain traces; and
    attenuating randomised cross-contamination in the cross-correlated extracted reflected acoustic signals using random noise attenuation techniques.

16. A method as claimed in claim 15 wherein the distinctive acoustic signal that is emitted by each source is of swept frequency form having a range of frequencies in the range 10 Hz to 100 Hz and a duration of 10 to 20 seconds with the proviso that the signal bandwidth, signal spectrum and total energy of the acoustic signals emitted by each source are substantially the same.

17. A method as claimed in claim 15, wherein the seismic data are recorded using an array of seismic sensors comprising geophones or accelerometers arranged in rows to form a grid.

18. A method as claimed in claim 15 wherein the extracted and cross-correlated time domain records are downloaded into a computer at a seismic processing centre which further processes the data using random noise attenuation techniques to attenuate the randomised cross-correlation in the extracted reflected acoustic signals.

19. A method as claimed in claim 15, wherein the 3-D seismic survey operation is a land-based 3-D seismic survey operation.

* * * * *